United States Patent
Kobayashi et al.

(10) Patent No.: US 6,704,754 B1
(45) Date of Patent: Mar. 9, 2004

(54) METHOD FOR SHARED USE OF MEDIUM-EXCHANGEABLE STORAGE DEVICE FOR PURPOSES OF BACKUP AND FILE SYSTEM, AND MEDIUM-EXCHANGEABLE RECORDING SYSTEM

(75) Inventors: Yuichi Kobayashi, Zama (JP); Kazuhiro Soeda, Ebina (JP); Kazutoshi Kato, Ebina (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 09/590,539

(22) Filed: Jun. 8, 2000

(30) Foreign Application Priority Data

Jun. 9, 1999 (JP) .......................................... 11-162500

(51) Int. Cl.$^7$ .......................... G06F 17/00; G06F 12/00
(52) U.S. Cl. ...................... 707/204; 707/205; 711/152; 711/162
(58) Field of Search ................................ 707/204, 200, 707/202, 205; 711/100, 147, 151, 152, 153, 154, 161, 162, 163, 167; 369/30.06, 30.05, 30.04, 30.28, 30.19, 30.2, 30.27

(56) References Cited

U.S. PATENT DOCUMENTS

| | | | | | |
|---|---|---|---|---|---|
| 5,386,545 | A | * | 1/1995 | Gombos, Jr. et al. | 707/204 |
| 5,574,851 | A | * | 11/1996 | Rathunde | 714/7 |
| 5,659,704 | A | * | 8/1997 | Burkes et al. | 711/114 |
| 5,966,730 | A | * | 10/1999 | Zulch | 711/162 |
| 6,026,414 | A | * | 2/2000 | Anglin | 707/204 |
| 6,115,798 | A | * | 9/2000 | Hayasaka | 711/162 |
| 6,353,878 | B1 | * | 3/2002 | Dunham | 711/162 |
| 6,400,657 | B1 | * | 6/2002 | Soeda et al. | 369/30.06 |

OTHER PUBLICATIONS

Mohan et al "An Efficient and Flexible Method of Archiving a Database", ACM 1993, pp. 139–146.*
Schoinas et al "Fine–grain Access Control for Distributed Shared Memory", ACM 1994, pp. 297–306.*

* cited by examiner

Primary Examiner—Uyen Le
(74) Attorney, Agent, or Firm—Townsend and Townsend and Crew LLP

(57) ABSTRACT

A medium-exchangeable storage device can be configured to serve as the underlying storage medium for file system and as a data backup medium. A technique is described which allows a medium-exchangeable storage device to services as a file system and as a backup device.

17 Claims, 8 Drawing Sheets

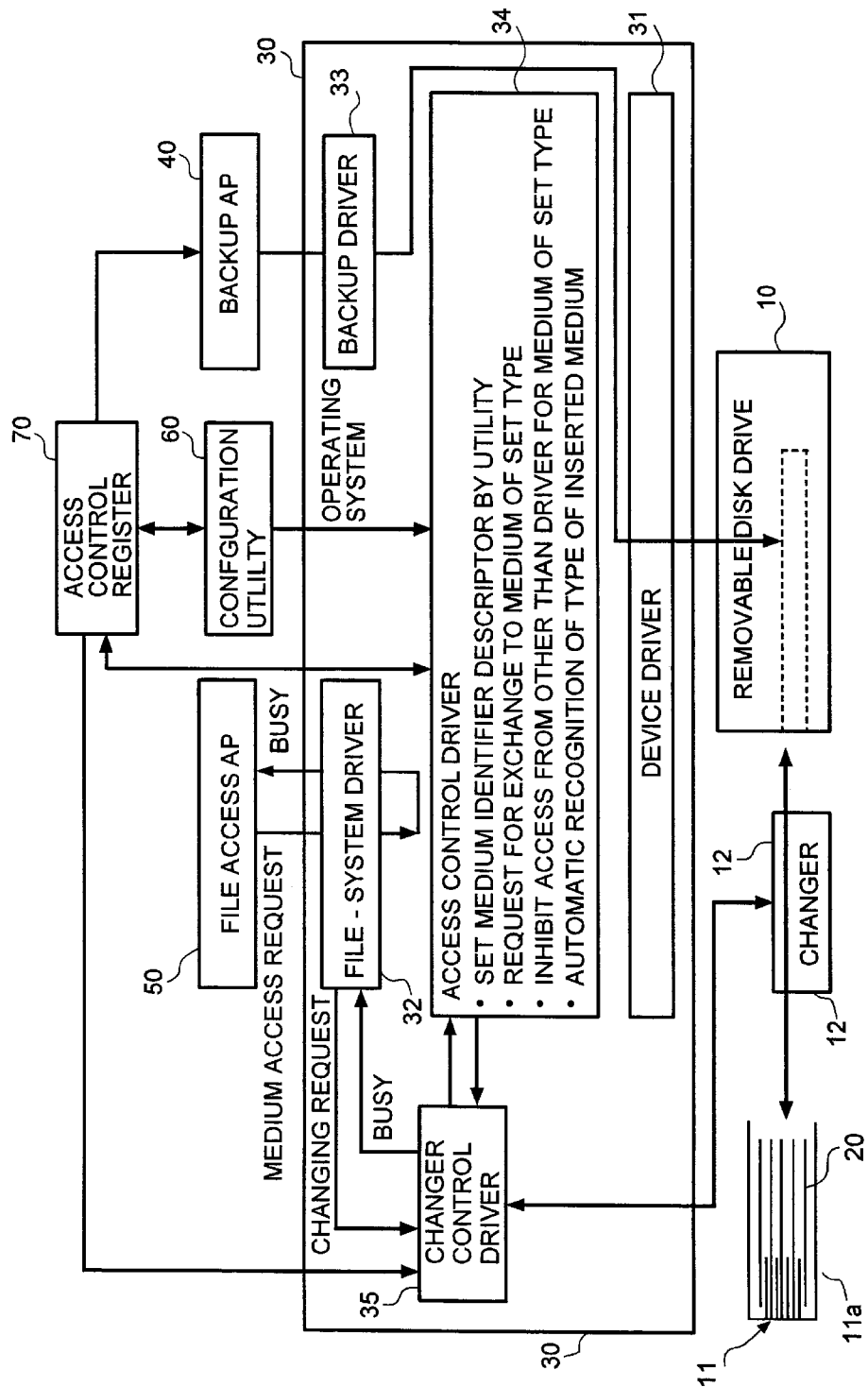

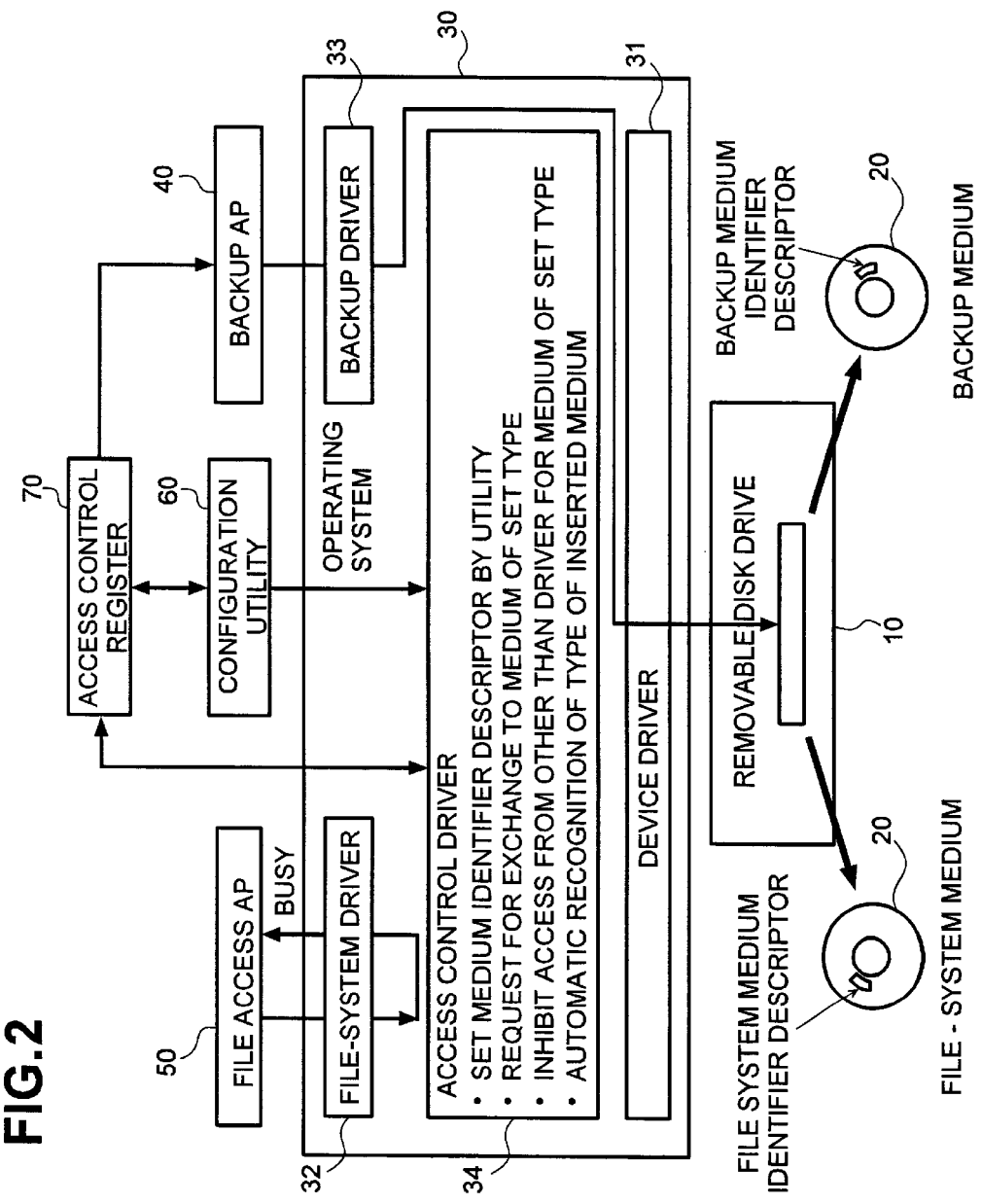

FIG.3

| | | | | TYPE OF VALUE (C:character string, D:DWORD value) | CONTENTS |
|---|---|---|---|---|---|
| (Standard) | | | | C | (null) |
| Changer Device | (Standard) | | | C | (null) |
| | Changer Device Max Number | | | D | max number 05 changer devices |
| | Non Changing Time | (Standard) | | C | (null) |
| | | Time | | D | changing limit time (ms) |
| | Chang- er 0 | (Standard) | | C | (null) |
| | | Vendor Id | | C | vendor ID |
| | | Product Id | | C | product ID |
| | | Drive Number | | D | virtual drive number (1: A  2: B~) |
| | | Update Flag | (Standard) | C | (null) |
| | | | Update | D | update flag(0 or 1) |
| | | Changing Stop Timer | (Standard) | C | (null) |
| | | | Time | D | changer control stop timer |
| | | Drive | (Standard) | C | (null) |
| | | | First Drive Number | D | first drive number (0 or 1) |
| | | | Number Data Transfer Elements | D | number of drives |
| | | | Wait Second | | D | changing wait time |
| | | | 001 | (Standard) | C | (null) |
| | | | | Status | D | status |
| | | | | Slot Number | D | slot number of moving source |
| | | | | LRU | D | priority |
| | | | | Logical Drive number | D | logical drive number (1: A  2: B~) |
| | | | | Device Name | C | device name |
| | | | | Harddisk Number | D | hard disk number |
| | | | | Partition Number | D | partition number |
| | | | | Changing Timer | D | changing limit timer |
| | | | | Backup Flag | D | object of backup on not |
| | | | 002~005 | generated by number of drivers | | |
| | | IEport | (Standard) | C | (null) |
| | | | First IE Port Number | D | first I/E element number (0 or 1) |
| | | | Number IE Elements | D | number of I/E elements |
| | | Slot | (Standard) | C | (null) |
| | | | First Slot Number | D | fist slot number (0 or 1) |
| | | | Number Storage Elements | D | number of slots |
| | | | Free Slot number | D | number of free slots |
| | | | 001 | (Standard) | C | (null) |
| | | | | Status | D | status (0: moral 0xffffffff : abnormal) |
| | | | | Slot Name | C | virtual folder name ("001") |
| | | | | Slot Number | D | sot number |
| | | | | Backup Flag | D | object of backup or not |
| | | | 002~005 | generated by number of slot | | |
| | | Transport | (Standard) | C | (null) |
| | | | First Transport Number | D | first medium transport element number (0 or 1) |
| | | | Number Transport Elements | D | number of medium transport elements |
| | Chang- er 1 | (Standard) | | C | (null) |

— generated by number of devices 71 references Drive section, 71a references 001 drive subsection, 72 references Slot section, 72a references 001 slot subsection. 70 is the overall table reference.

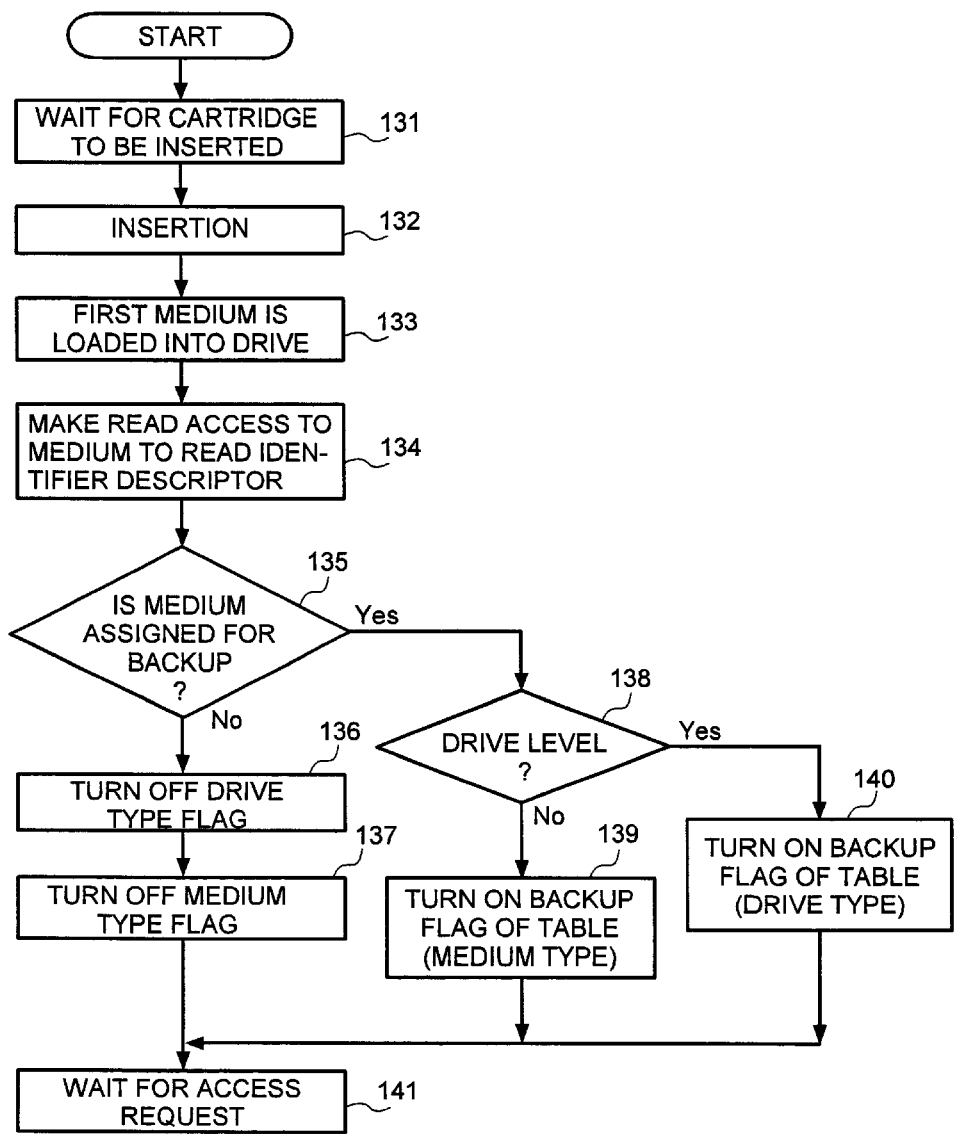

METHOD FOR SHARED USE OF MEDIUM-EXCHANGEABLE STORAGE DEVICE FOR PURPOSES OF BACKUP AND FILE SYSTEM, AND MEDIUM-EXCHANGEABLE RECORDING SYSTEM

This application claims priority under 35 U.S.C. Section 119(a) from Japanese Patent Application No. 11-162500, filed Jun. 9, 1999. This application relates to U.S. patent application Ser. No. 09/5899,066 (now U.S. Pat. No. 6,400,657) based on Japanese Patent Application No. 11-162499, filed Jun. 9, 1999, the disclosure of which is incorporated herein by reference.

BACKGROUND OF THE INVENTION

The present invention relates to a recording control technique in an information recording device and an information recording system, and more particularly to a technique for backing up data utilizing a mass or large-capacity storage device.

Known information processing systems, such as a personal computer or work station, can include a streaming tape device such as cassette streamer or a mass storage device such as DAT (digital audio tape recorder) used for backup of a large volume of data (for example, a hard disk drive). Recently the remarkable improvement in storage capacity of a medium-exchangeable storage device, such as a DVD-RAM or the like, provides storage capacity per medium equivalent to the storage capacity of a streaming tape device or DAT.

Thus, large-capacity medium-exchangeable storage devices such as a DVD-RAM or the like may be used as a backup device. There are, however, problems with such applications. Namely, the destination for the backup utility software associated with the operating system (OS) is targeted to the device for its use as backup device. Therefore, if a medium-exchangeable storage device is assigned to be a backup storage device as it is, its use as a storage device in an ordinary file system becomes difficult or impossible, thereby diminishing the availability of the large-capacity medium-exchangeable storage device.

If the medium-exchangeable storage device is forced into the shared use as a backup device and for ordinary file system use, there is a possibility that a backup operation will cause overwriting of data in the ordinary file system, resulting in lost data.

These problems are not limited to a data backup application. A similar problem may arise in an application in which multimedia data including picture data, audio data, etc. Namely, a specified application can involve a similar problem because the backup performance is usually realized by use of a specific data format instead of an OS standard file system.

SUMMARY OF THE INVENTION

This invention provides a technique for enabling shared use of a medium-exchangeable storage device as a data backup and as an ordinary file system, thereby improving the availability of the medium-exchangeable storage device, while maintaining its backup performance. Further, the invention provides a technique for enabling the shared use of a medium-exchangeable storage device as a data backup and as an ordinary file system without causing risk of data being lost.

In one embodiment, this invention provides each recording management unit, such as any medium-exchangeable storage device, recording drive, recording medium or the like, with data type control information indicating whether that recording management unit is to be used for a specified application. When an access request is generated to a recording management unit provided with data type control information indicative of the use of the recording management unit, the type of generated access request is compared with the previously set data type control information. Where the generated access request is an access request other than the specified application, a response indicative of access inhibition is made to the generated access request.

In a disk changer system provided with a plurality of exchangeable (or removable) recording media and accommodating recording media in a cartridge, each exchangeable recording media can be set with data type control information indicative of whether that recording medium should be used for the purpose of a particular application.

With the above approach in which a comparison for each recording media is made between the type of application making access to that media and the data type of the media being accessed, access is permitted only if the coincidence is obtained between both the types. Typically, a control exclusive of an OS standard file system access is enabled. This enables the coexistence of a standard backup system and a file system specific to a particular application becomes possible.

BRIEF DESCRIPTION OF THE DRAWINGS

FIG. 1 is a conceptual diagram showing one embodiment of an information processing system for implementing a method for control of an information processing device;

FIG. 2 is a conceptual diagram showing a modified embodiment of the information processing system for implementing another embodiment of the present invention;

FIG. 3 is a conceptual diagram showing an example of an access control register indicative of backup control information used in a control method for an information processing device according to a further embodiment of the present invention;

FIG. 8 is a flow chart showing still another example of a control method according to a further embodiment of the present invention.

DESCRIPTION OF THE SPECIFIC EMBODIMENTS

Embodiments of the present invention will now be described with reference to the drawings and using an application program is a program for performing a backup operation.

Figure 4:
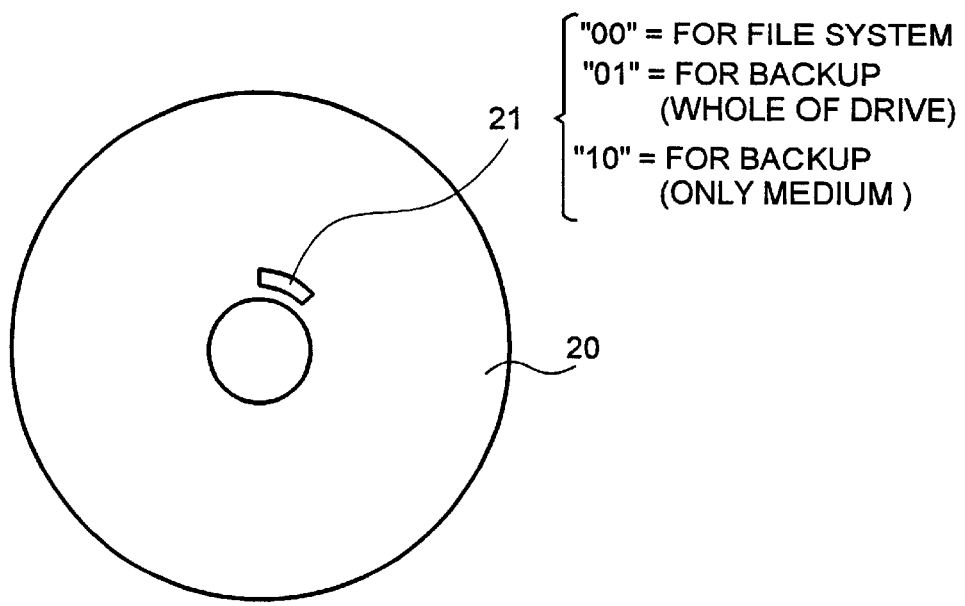
FIG. 4 is a conceptual diagram showing an example of an exchangeable medium used in the information processing device control method for one embodiment of the present invention.
Figure 5:
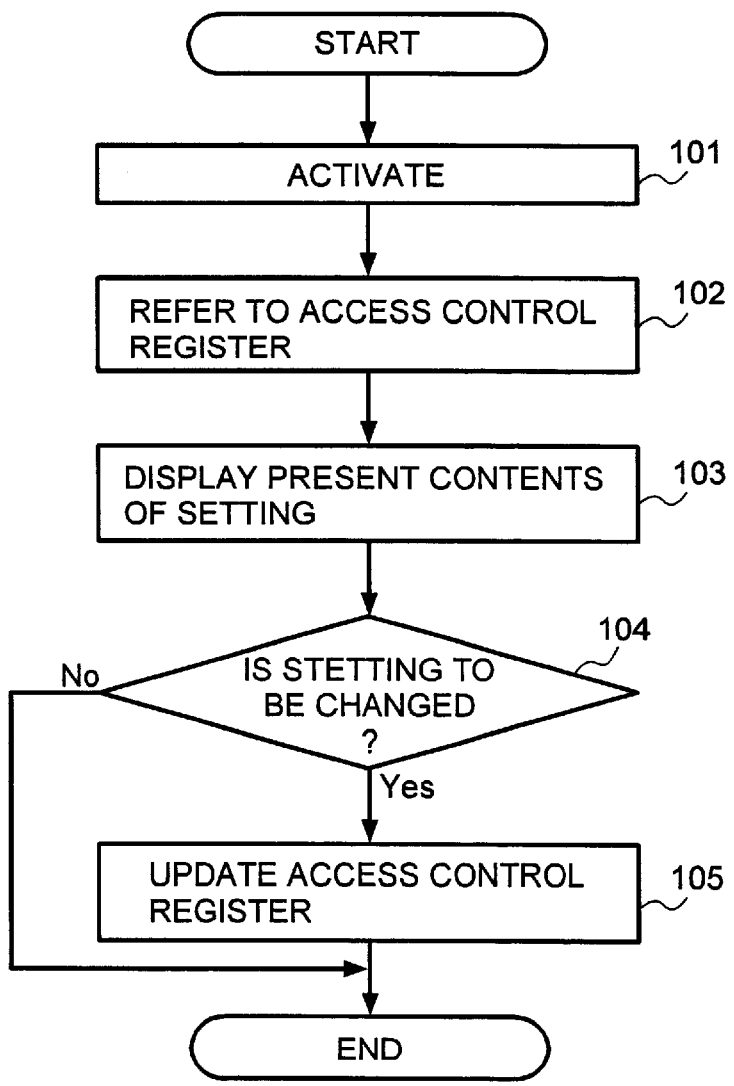
FIG. 5 is a flow chart showing an example of the control method for operation of the information processing device according to an embodiment of the invention.

FIG. 1 is a diagram of an example of an information processing system for carrying out a method for control of an information processing device. FIG. 3 is a conceptual diagram showing an example of the access control register for backup control information. FIG. 4 is a conceptual diagram of an exchangeable medium used in the method according to the present embodiment. FIGS. 5, 6, 7 and 8 are flow charts showing examples of the operation of a method according to the present embodiment.

In FIG. 1, reference numeral 10 denotes a removable (or exchangeable) disk drive, numeral 20 a removable (or exchangeable) medium, numeral 30 an operating system (OS), numeral 40 a backup application program operating on the operating system 30, and numeral 50 a file access application program operating on the operating system 30.

In FIG. 1 the removable disk drive 10 is provided with an exchangeable cartridge 11 in which a plurality of (for example, five) removable media 20 are accommodated and a changer 12 to change (or replace) the media 20 in the cartridge 11 automatically. The cartridge 11 has a plurality of slots 11a in which the removable media 20 are received. The control or management for change of the removable media 20 is performed with each slot 11a considered as one unit. Each slot 11a can be managed, for example, using the concept of a "folder" in a general-purpose OS.

The operating system 30 includes a device driver 31 for directly controlling the removable disk drive 10 (or making an access to the device), a file system driver 32 for accessing a general-purpose file system provided by the operating system 30 and stored on the removable medium 20, and a backup driver 33 for accessing the removable disk drive 10 or removable medium 20 designated for the exclusive use as backup.

To control the operation of the changer 12, a changer control driver 35 is provided in the operating system 30. The changer control driver 35 makes a change of the removable media 20 in accordance with a command from the file system driver 32. Also, the changer control driver 35 operates to inhibit the changing operation of the changer 12 using an access control register 70 discussed below.

In the present embodiment, access control driver 34 and a configuration utility 60 are provided as software for controlling the shared use of the removable disk drive 10 or the removable medium 20 as an ordinary file system or as a backup, as also discussed below. The access control driver 34 is provided in the operating system 30. The configuration utility 60 operates on the operating system 30.

The configuration utility 60 is provided with a function of performing an operation in which the removable disk driver 10 or the removable medium 20 can be used as a backup or as an ordinary file system. This is set in a removable disk drive or a removable medium of the access control register 70 in accordance with a designation from a user, or an operation in which a medium identifier descriptor 21 (shown in FIG. 4) is written into a part of the removable medium 20. This may be performed at the time of a media formatting operation. One embodiment of the access control register 70 is shown in FIG. 3.

The access control driver 34 sends an access request to the device driver 31 and is provided with functions which include: writing of a medium identifier descriptor 21 into a part of a removable medium 20 in accordance with a designation from the configuration utility 60, requesting exchange to a medium having a set type (or the display of EJECT message), inhibiting an access from the other than a driver having a type set by the access control register 70 (or a busy response), recognizing the type of a medium loaded in the removable disk drive 10, switching of the above access control, etc.

In the access control register 70, a part of a control entry 71 corresponding to each of plural (for example, five) removable disk drives 10 is set with a backup flag 71a for that drive. If backup flag=ON it indicates use as a backup, and if backup flag=OFF, it indicates use as a file system.

In the access control register 70 shown in FIG. 3, each of the five removable disk drives 10 typically is provided with changer 12 shown in FIG. 1 to handle five removable media 20. In this case, twenty five removable media 20 can be accessed as twenty-five virtual "folders" (folder numbers:001 to 025).

If changer 12 is uses a plurality of removable media 20 by one drive in such a manner that they are automatically changed, the individual removable media 20 are managed using the concept of slots. Thus a part of a control entry 72 for each slot (or removable medium 20) is set with a backup flag 72a (ON indicating use as a backup; OFF indicating use as a file system).

In FIG. 3, in the CONTENTS column corresponding to the entry UPDATE FLAG, "update flag"="0" indicates updating is made or "1" indicates updating is not made. In the CONTENTS column corresponding to the entry 71, "status" in the Status field is normal when 0, abnormal when 0xffffffff, and is out of an object of changing when 1. In the Changing Timer field, "changing limit timer" is (lapsed time from NT start) plus (changing limit time).

In the CONTENTS column corresponding to the entry 72, "virtual folder name" in the Slot Name field is applied with one of "001" to "100" in accordance with the sequence of twenty-five folders. In the Slot Number field, the "slot number" is 0xffffffff if there is no medium.

As shown in FIG. 4, a medium identifier descriptor 23 is written on removable medium 20. This may be "00" indicating that the removable medium 20 is assigned for the purpose of a file system, "01" indicating that all media handled by a removable disk drive 10 are assigned for backup, or "10" indicating that only the media banded by a removable disk drive 10 is assigned for backup.

Examples of the control method for operation of the information processing device and the information processing device according to the present embodiment will now be described. As exemplified by the flow chart of FIG. 5, the setting of a removable disk driver(s) 10 and/or a removable medium(s) 20 to be used as a backup is first performed by the configuration utility 60. When the configuration utility 60 is activated (step 101), the contents of the access control register 70 are read (step 102) and are presented to a user (step 103).

If the present contents of setting should be changed (step 104), the backup flag of the corresponding removable disk drive 10 or the backup flag 72a of the corresponding slot 11a (or removable medium 20) in the access control register 70 is turned ON. This designates the corresponding removable disk drive 10 or the corresponding removable medium 20 (or slot 11a) for the purpose of a backup (step 105). If no change is to be made, the processing is completed. Though no special illustration is shown, the configuration utility 60 can perform format processing for setting a media identifier descriptor 21 into a part of a removable medium 20 through the access control driver 34, as exemplified in FIG. 4.

Figure 6:
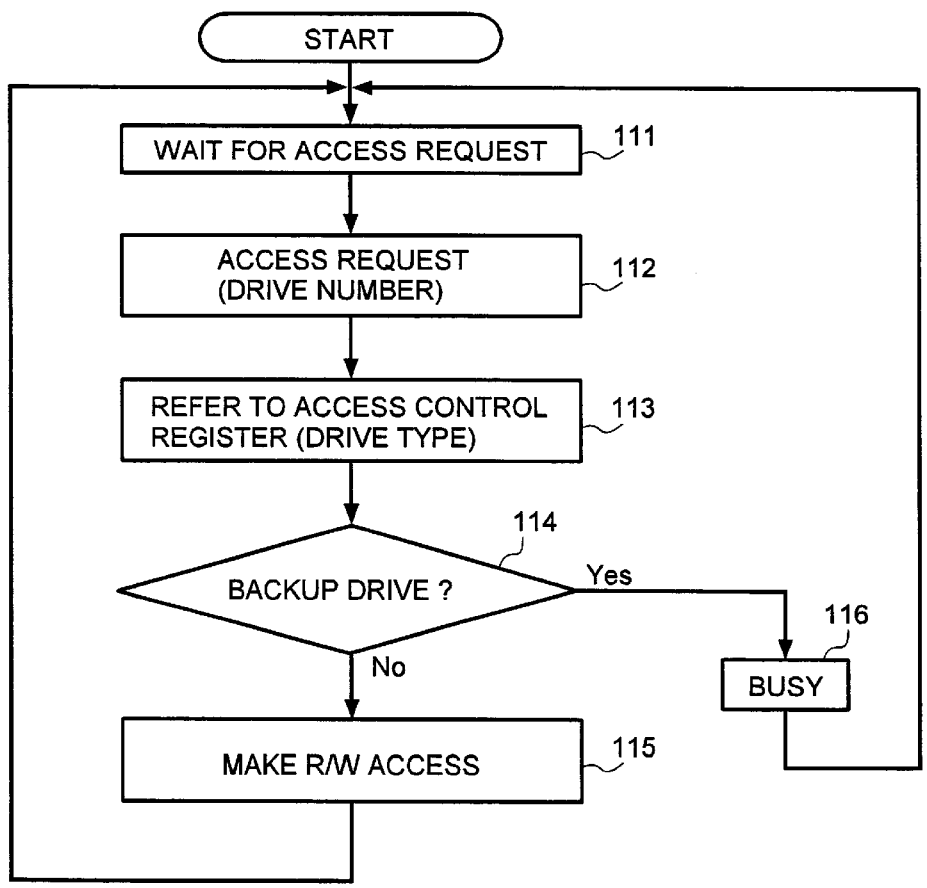
FIG. 6 is a flow chart showing another example of the control method for operation of the information processing device according to another embodiment of the invention.

The flow chart shown in FIG. 6 is an example of the operation of the access control driver 34 if reference to the access control register 70 is made. First, an access request from the host file system driver 32 (or the file access application program 50) (step 111) is needed. When an access request to an ordinary file system of a specified removable disk drive 10, based on the designation of a drive number is received (step 112), reference is made to a backup flag 71a corresponding to the designated drive number in a control entry 71 of the access control register 70 corresponding to each of plural removable disk drives 10 (step 113) to judge whether the drive in question is assigned for the purpose of a backup (step 114).

If the drive in question is not a backup drive, an R/W access to an ordinary file system designated from the file system driver 32 is made (step 115). Then, the flow returns to step 111 to wait for an access request. If the drive in question is a backup drive, the file system driver 32 (or the file access application program 50) is informed of a response indicating that the drive in question is busy (step 116).

Figure 7:
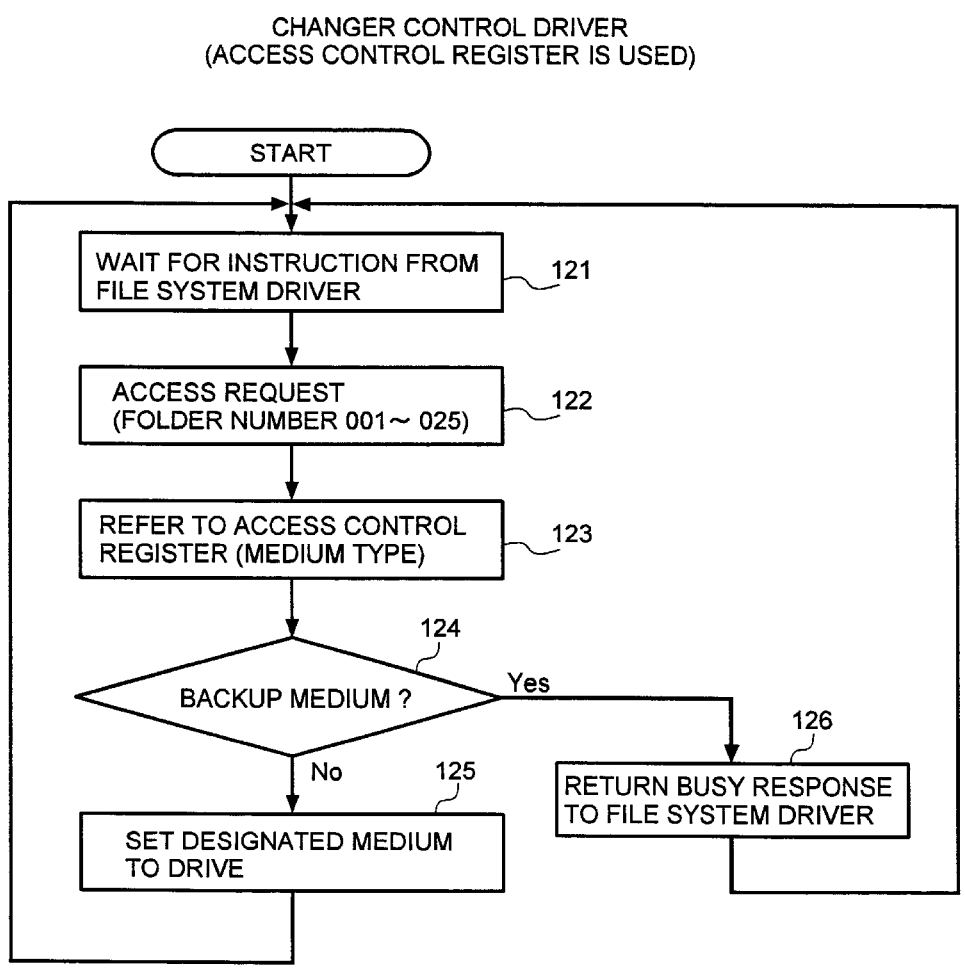
FIG. 7 is a flow chart showing a further example of the control method.

Next, an example of the operation of the changer control driver 35 exemplified in FIG. 1 will be described using a flow chart shown in FIG. 7. First, the system waits for a changing request from the host file system driver 32 (or the file access application program 50) (step 121). If a request for change of a specified folder (or removable medium 20) based on the designation of a folder number is received (step 122), the reference is made to a backup flag 72a corresponding to the designated folder number in a control entry 72 of the access control register 70 corresponding to each of plural folders (in the shown case, twenty five folders having the folder numbers of 001 to 025) (step 123) to judge whether or not the folder in question is assigned for the purpose of a backup (step 124).

If the folder or removable medium in question is not a backup medium, the change of a removable medium 20 corresponding to the target folder number designated from the file system driver 32 is made for the removable disk driver 10 (step 125). Then, the flow returns to step 121 to wait for a changing request. If the medium in question is a backup medium, the file system driver 32 (or the file access application program 50) is informed of a response indicating that the drive in question is busy (step 126).

Next, the description using the flow chart shown in FIG. 8 is made of an example if the access control driver 34 reads a medium identifier descriptor 21 on a removable medium 20 to perform an operation for setting the access control register 70. First, the system waits for a cartridge 11 to be inserted (step 131). When the cartridge 11 is inserted (step 132), the changer 12 is activated to load the first removable medium 20 into the removable disk drive 10 (step 133) so that a medium identifier descriptor 21 set on the loaded removable medium 201s read (step 134).

Next a judgment is made of whether or not the read medium identifier descriptor 21 indicates that the removable medium 20 in question is assigned for the purpose of a backup (step 135). If the removable medium 20 is not assigned for a backup, a backup flag 71a in a control entry 71 of the access control register 70 corresponding to the removable disk drive 10 being loaded with the removable medium 20 is turned OFF (step 136). Also, a backup flag 72a in a control entry 72 for a folder corresponding to the removable medium is turned OFF (step 137). Then, the flow goes to step 141 to wait for an access request from the host file system driver 32.

If it is determined in step 135 that the removable medium 20 in question is assigned for backup (that is, the medium identifier descriptor 21 is other than "00"), the judgment is made of whether the assigned backup is of a drive level, that is, whether or not the medium identifier descriptor 21 is "01" (step 138).

If the assigned backup is not a drive level backup (that is, the medium identifier descriptor 21 is "10"), a backup flag 72a in a control entry 72 of the access control register 70 for a folder corresponding to the removable medium 20 in question is turned ON (step 139). On the other hand, if the assigned backup is a drive level backup (that is, the medium identifier descriptor 21 is "01"), a backup flag 71a in a control entry 71 of the access control register 70 corresponding to the removable disk drive 10 being loaded with the removable medium 20 in question is turned ON (step 140). After step 139 or 140, the flow goes to step 141 to wait for an access request from the host file system driver 32.

According to control method for the information processing device in the present embodiment as described above, it is possible to improve the availability of data by making shared use of the removable disk drive 10 as a data backup and an as ordinary file system. In addition, the setting of, and the reference to, the access control register 70 and the medium identifier descriptor 21 enables the exact judgment of whether the assignment is made to the use as a backup, inclusive of the distinction between a backup in the level of an individual removable disk drive 10 and a backup in the level of an individual removable medium 20. Therefore, the shared use of the removable disk drive 10 as a data backup and an ordinary file system is enabled without concern for data being lost at the time of shared use as the data backup and the ordinary file system.

Further, the backup application program 40 can use software operating on an ordinary general-purpose OS as it is. Therefore, the shared use of the removable disk drive 10 for both data backup and as an ordinary file system is possible without deterioration of data backup operations.

The foregoing description has been made in conjunction with the example in which removable disk drive 10 is provided with changer 12. The present invention, however, may be applied to situations where the exchange of the removable media 20 is manual, as shown in FIG. 2. Though the foregoing embodiment has been described in connection with a backup application, it is also useful for other applications.

The present invention enables the shared use of a medium-exchangeable mass storage device to provide a specified application (for example, data backup) and as an ordinary file system. Therefore, the availability of the storage device is improved without concern for losing data.

What is claimed is:

1. A method for control of a medium-exchangeable recording device configured to load any one of a plurality of removable recording media, the method comprising:

comparing a type of a request for access to the recording device with backup control information provided for each recording management unit of recording data to be accessed, the backup control information indicating whether that recording management unit should be used for a data backup;

when an access request other than a backup operation is provided to a first recording management unit having backup control information indicating that the use is for a data backup, making a response to inhibit access by the access request; and in response to the access request, replacing the first recording management unit by loading a second recording management unit, the second recording management unit being selected based on the access request.

2. A method according to claim 1, wherein the recording management unit of recording data is a medium-exchangeable recording device.

3. A method according to claim 1, wherein the recording management unit of recording data is a recording drive with which a medium-exchangeable recording device is provided.

4. A method according to claim 1, wherein the recording management unit of recording data is a recording medium selectively accommodated in a cartridge loaded in a recording drive with which a medium-exchangeable recording device is provided.

5. A method according to claim 1, wherein the recording management unit of recording data is a removable recording medium.

6. A method according to claim 1, wherein the backup control information is included as a part of system management information.

7. A method according to claim 1, further comprising a step in which when an access request other than a backup operation is generated to a recording management unit provided with its backup control information set to indicate that the recording management unit should not be used for the purpose of a backup, a recording medium corresponding to the access request is loaded.

8. A medium-exchangeable recording system provided with an information processing portion for performing a recording data operation, at least one removable recording medium, and at least one recording portion for performing a recording or a reproducing operation on the removable recording medium, the system comprising:

data type information storing apparatus to store the type of recording data corresponding to its use for each recording management unit of recording data; and access control apparatus responsive to a request for access to a recording management unit for informing the access requester of the permission or the inhibition of access to the recording management unit on the basis of the type of recording data stored in the data type information storing apparatus and the type of the access request, the access control apparatus further responsive to the request for access by obtaining a recording management unit from among a plurality of recording management units according to the type of the access request, the plurality of recording management units including units that are used for data backup and units that are not used for data backup.

9. A medium-exchangeable recording system according to claim 8, wherein the data type information storing apparatus is storing backup information indicating whether or not the recording management unit should be used for the purpose of a backup, and the access control apparatus informs the access requester of the permission or the inhibition of access to the recording management unit on the basis of the backup information stored in the data type information storing apparatus and the type of the access request.

10. A medium-exchangeable recording system according to claim 8, wherein the data type information storing apparatus is storing the type of recording data for each of all recording management units capable of being accessed in the medium-exchangeable recording system.

11. A medium-exchangeable recording system according to claim 8, wherein the data type information storing apparatus is storing the type of recording data with a medium-exchangeable recording device taken as the recording management unit of recording data.

12. A medium-exchangeable recording system according to claim 8, wherein the data type information storing apparatus is storing the type of recording data with a recording drive taken as the recording management unit of recording data, a medium-exchangeable recording device being provided with the recording drive.

13. A medium-exchangeable recording system according to claim 8, wherein the data type information storing apparatus is storing the type of recording data with a recording medium taken as the recording management unit of recording data, the recording medium being selectively accommodated in a cartridge loaded in a recording drive with which a medium-exchangeable recording device is provided.

14. A medium-exchangeable recording system according to claim 8, wherein the data type information storing apparatus is storing the type of recording data with a removable recording medium taken as the recording management unit of recording data.

15. A medium-exchangeable recording system according to claim 8, further comprising changer control apparatus for controlling a changer on the basis of an instruction for designation of a recording medium, the changer selectively accommodating a plurality of recording media into a cartridge and loading the cartridge into the recording portion, the changer control apparatus making a response indicative of access permission or inhibition to the access requester in accordance with the type of recording data stored in the data type information storing apparatus corresponding to the instruction and the type of the access request or operating the changer in accordance with the instruction.

16. A medium-exchangeable recording system according to claim 8, wherein the removable recording medium is provided with a medium identifier information recording portion for storing at least one of information indicating that the removable recording medium should be used for the purpose of a file system, information indicating that the removable recording medium should be used for the purpose of a backup, and information indicating that a recording drive making an access to the removable recording medium should be used for the purpose of a backup, the data type information storing apparatus reads the information in the medium identifier information recording portion for each removable recording medium and stores the read information, and the access control apparatus responds to a request for access to a removable recording medium to inform the access requester of the permission or inhibition of access to the removable recording medium on the basis of the type of recording data for the removable recording medium stored in the data type information storing apparatus and the type of the request for access to the removable recording medium.

17. A medium-exchangeable recording system according to claim 16, wherein the medium identifier information recording portion is storing at least one of information indicating that each of plural divisional recording medium block units resulting from the division of recording media should be used for the purpose of a file system, information indicating that the block unit should be used for the purpose of a backup, and information indicating that a recording drive making an access to the recording medium should be used for the purpose of a backup.

* * * * *